(No Model.)

W. VON BERGEN.
Combined Camera and Magic Lantern.

No. 243,177. Patented June 21, 1881.

WITNESSES:
Chas. Nix
C. Sedgwick

INVENTOR:
W. Von Bergen
BY Munn & Co
ATTORNEYS.

UNITED STATES PATENT OFFICE.

WILLIAM VON BERGEN, OF ANDOVER, MASSACHUSETTS.

COMBINED CAMERA AND MAGIC LANTERN.

SPECIFICATION forming part of Letters Patent No. 243,177, dated June 21, 1881.

Application filed August 13, 1880. (No model.)

*To all whom it may concern:*

Be it known that I, WILLIAM VON BERGEN, of Andover, in the county of Essex and State of Massachusetts, have invented a new and useful Improvement in a Combined Camera and Magic Lantern, of which the following is a specification.

The object of my invention is to provide an apparatus that can be used at will either as a photographic camera or as a magic lantern, thereby saving the expense of two instruments.

The construction will be more particularly described hereinafter with reference to the accompanying drawings, wherein—

Figure 1:
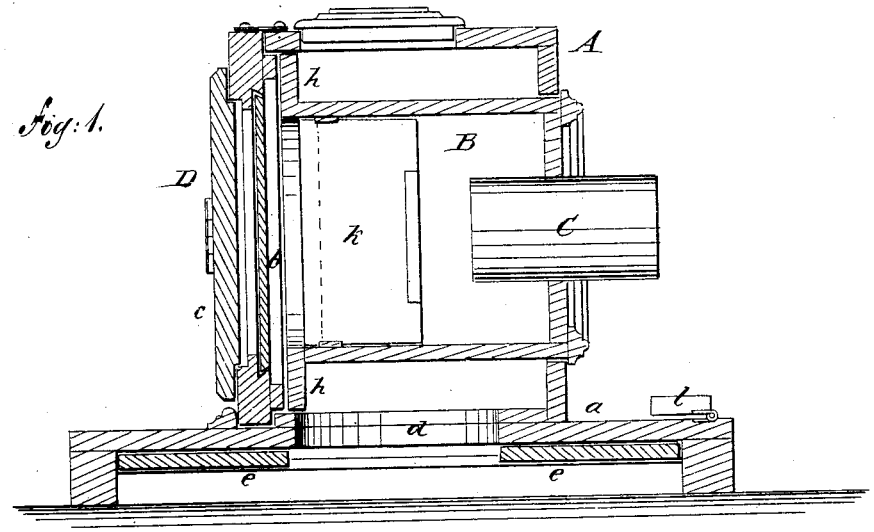
Figure 2:
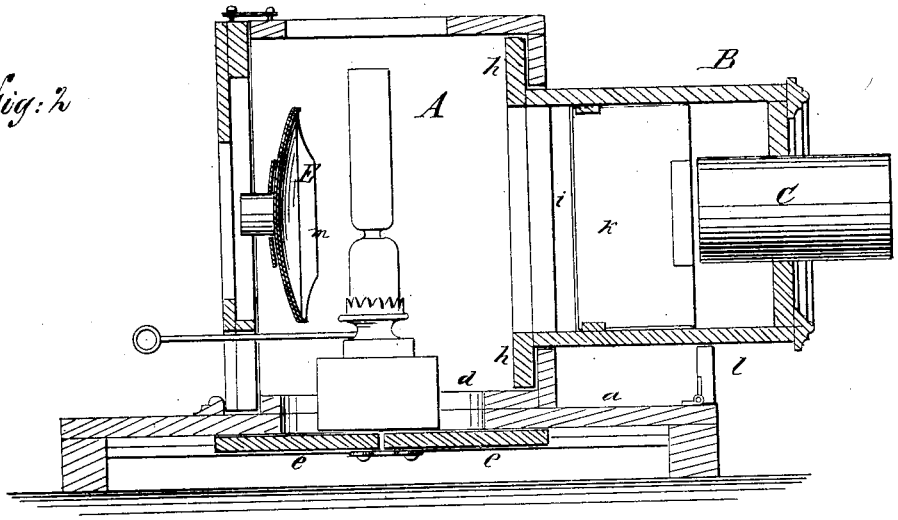
Figure 3:
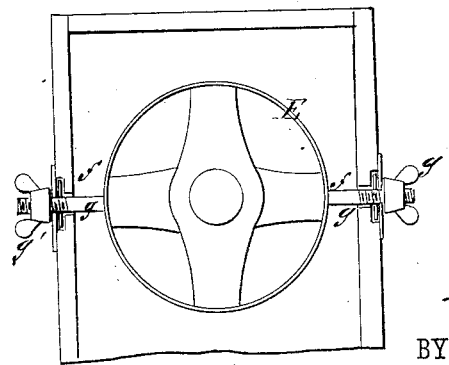

Figure 1 is a vertical longitudinal section of my improved apparatus as arranged for use as a camera. Fig. 2 is a similar section of the same arranged for use as a magic lantern; and Fig. 3 is a rear view of the box with the plate-holder removed, showing the pivoted reflector.

Similar letters of reference indicate corresponding parts.

A is the outer box, fixed on a suitable support, *a*.

B is the inner box, extending through a front opening of box A, and carrying the lens-tube C, that is adjustable lengthwise.

The back of box A is fitted with a plate-holder, D, having a dark-slide, *b*, and a hinged door or flap, *c*, that can be opened, as usual, for insertion of the plate. In the bottom of box A is an opening, *d*, for insertion of the lamp, which opening is fitted with slides *e*, that move in grooves in the bottom of the box, so that the opening *d* can be closed, or may be left open for admission of air. In the top of box A is an opening for escape of heat from the lamp-chimney, and at the back of the box, in the sides, there are slots *f* for receiving the pivots of reflector E. This reflector is of concave form, with side reflectors, *m*, that serve to intensify and throw forward the rays of light. At the sides of the reflector are pins *g g*, that enter the slots *f* of box A, and serve as trunnions on which the reflector can turn. These pins *g* are provided with screw-nuts *g'*, by which the reflector is to be clamped and held.

The inner box, B, is supported by the front opening of box A, and by a flanged rim, *h*, at its back, and which strikes against the inside of box A. In the sides of box B there are slots *i*, which, when the box is drawn out, come outside of box A, so that they may be used for the insertion of the picture-slides. These openings *i* are fitted with slides *k* for closing them to exclude light when the apparatus is used as a camera, and a long back focus is obtained by drawing out box B. Upon the base *a* is fitted a hinged block, *l*, for use as a rest for box B when drawn out, which block is turned down out of the way when not in use.

The lens-tube C is fitted loosely in box B, so that it may be drawn out or pushed in, as required. The apparatus has no condensing-lenses, as they are not required. With the box B pushed in, as shown in Fig. 1, the openings in box A are cut off, and the apparatus is complete for use as a camera. To adapt it for use as a magic lantern, box B is to be drawn out and the lamp put in place, and by removal of plate-holder D the reflector can be put in position. The plate-holder is to be replaced, or a separate back can be applied, as shown in Fig. 2.

By this construction the apparatus is adapted for a double purpose and the expense of separate instruments saved.

Having thus fully described my invention, I claim as new and desire to secure by Letters Patent—

The photographic camera and magic-lantern box consisting of outer box, A, provided with openings *a*, slides *e*, and slots *f*, inner sliding box, B, provided with adjustable lens-tube C and slots *i*, and the plate-holder D, combined for use substantially as shown and described.

WILLIAM VON BERGEN.

Witnesses:
GEORGE W. FOSTER,
GEORGE FOSTER.